(12) United States Patent
Zhou et al.

(10) Patent No.: US 11,354,841 B2
(45) Date of Patent: Jun. 7, 2022

(54) SPEECH-DRIVEN FACIAL ANIMATION GENERATION METHOD

(71) Applicants: ZHEJIANG UNIVERSITY, Hangzhou (CN); FACEUNITY TECHNOLOGY CO., LTD., Hangzhou (CN)

(72) Inventors: Kun Zhou, Hangzhou (CN); Yujin Chai, Hangzhou (CN); Yanlin Weng, Hangzhou (CN); Lvdi Wang, Hangzhou (CN)

(73) Assignees: ZHEJIANG UNIVERSITY, Hangzhou (CN); FACEUNITY TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/214,936

(22) Filed: Mar. 29, 2021

(65) Prior Publication Data
US 2021/0233299 A1 Jul. 29, 2021

Related U.S. Application Data

(63) Continuation of application No. PCT/CN2019/128739, filed on Dec. 26, 2019.

(51) Int. Cl.
*G06T 13/20* (2011.01)
*G10L 25/24* (2013.01)
(Continued)

(52) U.S. Cl.
CPC ............ *G06T 13/205* (2013.01); *G06T 13/40* (2013.01); *G10L 25/18* (2013.01); *G10L 25/24* (2013.01); *G10L 25/30* (2013.01)

(58) Field of Classification Search
CPC ....... G06T 13/205; G06T 13/40; G10L 25/18; G10L 25/24; G10L 25/30
See application file for complete search history.

(56) References Cited

U.S. PATENT DOCUMENTS

| 10,249,314 | B1 * | 4/2019 | Aryal | G10L 21/003 |
| 10,453,476 | B1 * | 10/2019 | Aryal | G10L 25/30 |
| 10,755,463 | B1 * | 8/2020 | Albuz | G10L 13/00 |

(Continued)

FOREIGN PATENT DOCUMENTS

| CN | 103279970 A | 9/2013 |
| CN | 107004287 A | 8/2017 |

(Continued)

OTHER PUBLICATIONS

International Search Report (PCT/CN2019/128739); dated Oct. 12, 2020.

*Primary Examiner* — David T Welch
(74) *Attorney, Agent, or Firm* — W&G Law Group

(57) ABSTRACT

The present disclosure discloses a speech-driven facial animation generation method. The method is mainly divided into six steps: extracting speech features, collecting frequency information, summarizing time information, decoding action features, driving a facial model, and sliding a signal window. The present disclosure can drive, according to an input speech audio signal, any facial model in real time under a particular delay to generate animation. The quality of the animation reaches the currently most advanced speech animation technology level, and has the characteristics of light weight and good robustness. The present disclosure can be used to generate speech animation under different scenes, such as VR virtual social networking, and virtual speech assistants and games.

6 Claims, 5 Drawing Sheets

(51) Int. Cl.
    *G10L 25/30*     (2013.01)
    *G06T 13/40*     (2011.01)
    *G10L 25/18*     (2013.01)

(56) References Cited

U.S. PATENT DOCUMENTS

| | | | | |
|---|---|---|---|---|
| 10,885,693 | B1* | 1/2021 | Saragih | G06K 9/6273 |
| 10,970,907 | B1* | 4/2021 | Albuz | G06N 20/00 |
| 2006/0290699 | A1* | 12/2006 | Dimtrva | G06V 40/168 |
| | | | | 345/473 |
| 2012/0019517 | A1* | 1/2012 | Corazza | G06T 17/20 |
| | | | | 345/419 |
| 2014/0278403 | A1* | 9/2014 | Jacob | G06F 3/011 |
| | | | | 704/235 |
| 2016/0300379 | A1* | 10/2016 | Du | G06T 13/205 |
| 2018/0203946 | A1 | 7/2018 | Kolluru et al. | |
| 2019/0035149 | A1* | 1/2019 | Chen | G06T 17/20 |
| 2019/0074028 | A1* | 3/2019 | Howard | G10L 15/20 |
| 2019/0122411 | A1* | 4/2019 | Sachs | G06V 20/647 |
| 2019/0355347 | A1* | 11/2019 | Arik | G10L 15/16 |
| 2020/0035247 | A1* | 1/2020 | Boyadjiev | G10L 17/22 |
| 2020/0117887 | A1* | 4/2020 | Chaudhuri | G06N 5/046 |
| 2020/0135226 | A1* | 4/2020 | Mittal | G06N 3/04 |
| 2020/0234690 | A1* | 7/2020 | Savchenkov | G06V 40/171 |
| 2020/0302667 | A1* | 9/2020 | del Val Santos | G06T 13/205 |
| 2021/0027512 | A1* | 1/2021 | Park | G06V 40/174 |
| 2021/0358496 | A1* | 11/2021 | Sukumar | G10L 15/08 |

FOREIGN PATENT DOCUMENTS

| | | |
|---|---|---|
| CN | 109448083 A | 3/2019 |
| CN | 109599113 A | 4/2019 |

\* cited by examiner

SPEECH-DRIVEN FACIAL ANIMATION GENERATION METHOD

TECHNICAL FIELD

The present disclosure relates to the field of facial animation, and in particular, to a speech-driven facial animation (speech animation for short) generation method.

BACKGROUND

Procedural voice animation technologies (Yuyu Xu, Andrew W Feng, Stacy Marsella, and Ari Shapiro. A practical and configurable lip sync method for games. In Proceedings of Motion on Games, pages 131-140. ACM, 2013.) (Pif Edwards, Chris Landreth, Eugene Fiume, and Karan Singh. Jali: an animator-centric viseme model for expressive lip synchronization. ACM Transactions on Graphics (TOG), 35(4):127, 2016.) automatically recognize phoneme sequences that reflect pronunciation (such as syllables in English and Chinese Phonetic Alphabets in Chinese) from speech, then group phonemes into visual elements according to the shapes of the human lip during pronunciation, and make an animation keyframe for each visual element; and connect the entire sequences through particular coarticulation rules to obtain facial animation. These technologies are generally limited to artificial keyframes and coarticulation rules and cannot produce real speech animation, and are limited by the accuracy of phoneme recognition results.

Sample-based speech animation technologies (Tony Ezzat, Gadi Geiger, and Tomaso Poggio. Trainable video-realistic speech animation, volume 21. ACM, 2002.) (Sarah L Taylor, Moshe Mahler, Barry-John Theobald, and Iain Matthews. Dynamic units of visual speech. In Proceedings of the ACM SIGGRAPH/Eurographics Symposium on Computer Animation, pages 275-284. Eurographics Association, 2012.) also map phoneme sequences to animation, but in order to improve the authenticity of animation, artificial rules are no longer used, and multiple animation segments are directly extracted from data samples for splicing. The effect of these technologies is generally limited to the number of samples, and there are often defects at a position where the splicing of segments occurs. Also, they are limited by the accuracy of phoneme recognition results.

Wang et al. propose a technology based on a hidden Markov chain model (Lijuan Wang, Wei Han, Frank Soong, and Qiang Huo. Text-driven 3d photo-realistic talking head. In INTERSPEECH 2011. International Speech Communication Association, September 2011.), which extracts Mel-Frequency Cepstral Coefficients (MFCC) from speech signals as speech features, and uses Principal Component Analysis (PCA) coefficients of face landmarks in two-dimensional images as animation features. This technology uses hidden Markov chains to model a mapping relationship between speech features and animation features. Mining natural rules between the two kinds of features improves the data utilization compared with the sample-based technologies.

In recent years, a deep neural network has promoted the further improvement of speech animation technologies. Fan et al. (Bo Fan, Lei Xie, Shan Yang, Lijuan Wang, and Frank K Soong. A deep bidirectional lstm approach for video-realistic talking head. Multimedia Tools and Applications, 75(9):5287-5309, 2016.) use a Bidirectional Long short-term Memory (BiLSTM) to learn, from data, the mapping from speech to animation, especially to learn a natural coarticulation mode. However, the BiLSTM requires whole speech input and cannot be generated in real time. Suwajanakorn et al. propose a delayed one-way LSTM based on this (Supasorn Suwajanakorn, Steven M Seitz, and Ira Kemelmacher-Shlizerman. Synthesizing obama: learning lip sync from audio. ACM Transactions on Graphics (TOG), 36(4):95, 2017.) to help with coarticulation by obtaining the following information through a short delay, so as to generate high-quality speech animation in real time under a particular delay. The limitations of this technology are that it requires a lot of data and can only produce facial videos of particular persons.

Talyor et al. (Sarah Taylor, Taehwan Kim, Yisong Yue, Moshe Mahler, James Krahe, Anastasio Garcia Rodriguez, Jessica Hodgins, and Iain Matthews. A deep learning approach for generalized speech animation. ACM Transactions on Graphics (TOG), 36(4):93, 2017.) propose a sliding window technology in which phonemes within one window length are mapped to facial Active Appearance Model (AAM) coefficients by using a Deep Neural Network (DNN). The input phoneme window includes transient contextual information, and it can be well used by the DNN to learn phonological patterns. Karras et al. (Tera Karras, Timo Aila, Samuli Laine, Antti Herva, and Jaakko Lehtinen. Audio-driven facial animation by joint end-to-end learning of pose and emotion. ACM Transactions on Graphics (TOG), 36(4):94, 2017.) further improve the sliding window technology which inputs Linear Predictive Coding (LPC) speech features of one window and after a two-stage convolution neural network (a formant analysis stage corresponding to a feature dimension, a pronunciation stage corresponding to a time dimension) and a two-layer fully connection network, outputs a frame of vertex positions of a three-dimensional facial model. These two technologies have poor generalization, especially in a case where input speech is greatly different from training speech of the model. Cudeiro et al. (Daniel Cudeiro, Timo Bolkart, Cassidy Laidlaw, Anurag Ranjan, and Michael Black. Capture, learning, and synthesis of 3D speaking styles. Computer Vision and Pattern Recognition (CVPR), pages 10101-10111, 2019.) make further improvement and use an existing speech recognition module to extract speech features, thereby improving the generalization. However, at the same time, the introduced speech recognition module is too large in size, and animation is generated at a slow speed by this technology.

SUMMARY

An objective of the present disclosure is to provide a speech-driven facial animation generation method with respect to deficiencies in the prior art. In the present disclosure, frequency features of a speech signal are extracted using Mel spectrogram. Deformation gradients calculated with reference to an expressionless and mouth-closed facial model is used to represent facial motion in animation. In the present disclosure, Mel spectrogram features in a window are mapped to one frame of deformation gradients through a three-stage (corresponding to steps (2) to (4)) deep neural network. The deformation gradients can drive any facial model, and an output style can be explicitly controlled by a one-hot vector in the deep neural network.

A purpose of the present disclosure is achieved through the following technical solution: a speech-driven facial animation generation method, including steps of:

(1) extracting speech features: extracting Mel spectrogram features from speech in a window; the features being a three-dimensional tensor composed of a feature map dimension, a frequency dimension, and a time dimension;

(2) collecting frequency information: for the Mel spectrogram obtained in step (1), abstracting and collecting, by using a neural network, all frequency information along a direction of the frequency dimension, to obtain frequency abstract information;

(3) summarizing time information: for the frequency abstract information obtained in step (2), determining, by using the neural network, a degree of importance of each frame of information in a time context along a direction of the time dimension, and performing summarization according to the degree of importance, to obtain time summary information;

(4) decoding action features: connecting the time summary information obtained in step (3) to a one-hot vector of a control style inputted by a user; outputting scaling/shearing coefficients and rotation coefficients respectively through two branches of the neural network, and combining the coefficients outputted by the two branches to obtain deformation gradients representing facial actions;

(5) driving a facial model: for any given facial model (expressionless and mouth-closed), driving the facial model by using the deformation gradients obtained in step (4), to perform a corresponding facial action; and (6) sliding a signal window: repeating step (1) to step (5), and processing all speech signal windows, to generate complete facial animation.

The present disclosure has the following beneficial effects: the method for collecting frequency information in step (2) is designed according to Mel spectrogram characteristics, and can robustly abstract speech features; the method for summarizing time information in step (3) is designed according to pronunciation principles of consonants and vowels, which can effectively learn human natural pronunciation patterns; and in step (4), deformational gradients, which can describe local changes of facial motion more accurately, are first time used to represent facial actions in speech-driven facial animation. This method achieves the currently most advanced speech-driven facial animation technology, and is lightweight and robust, and can achieve real-time (under a particular delay). The present disclosure can use speech signals to drive generation of facial animation in applications such as VR virtual social networking, and virtual speech assistants and games.

DESCRIPTION OF EMBODIMENTS

Figure 1:
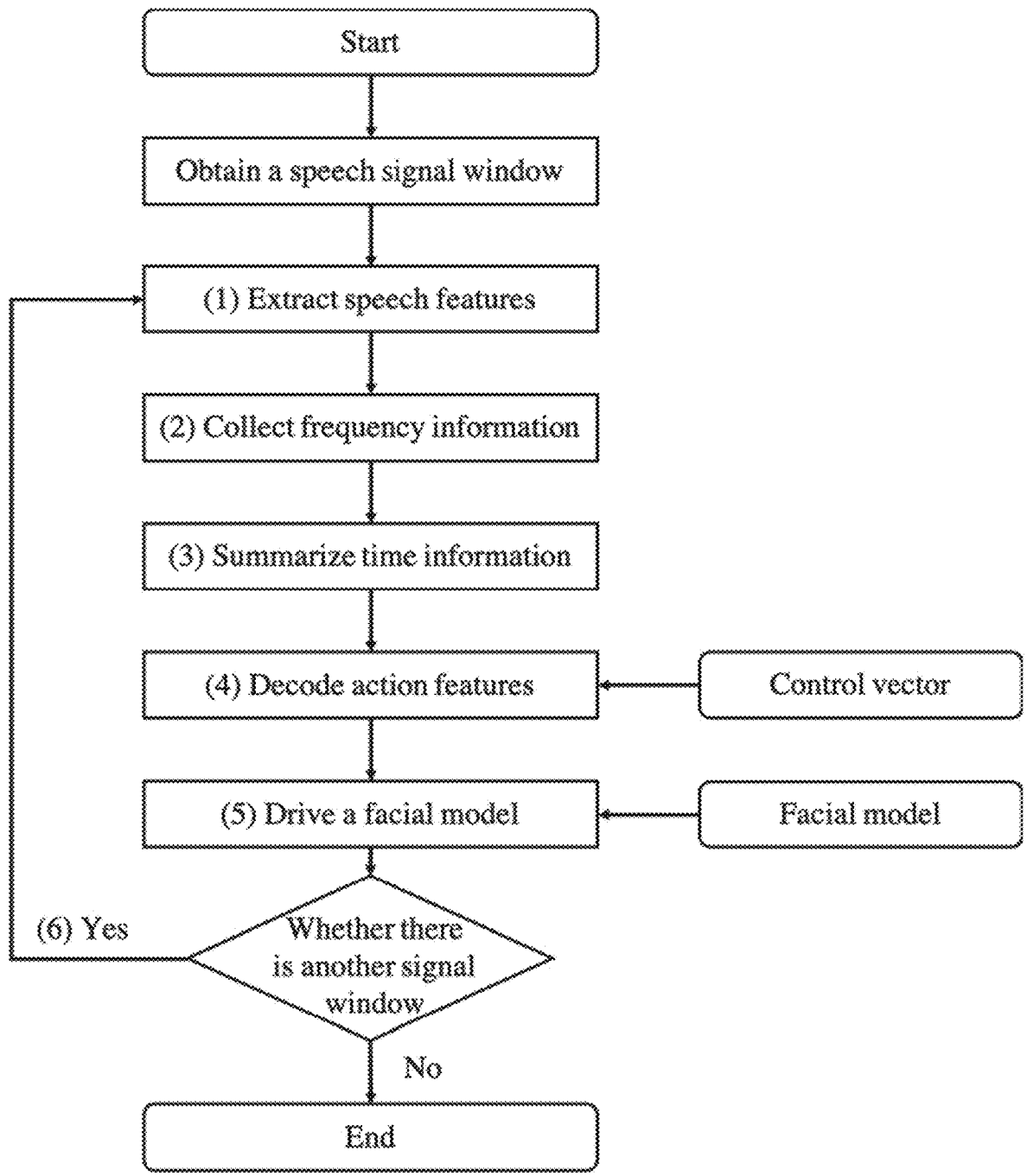
FIG. 1 is a schematic flowchart of a method according to the present disclosure.

The core technology of the present disclosure uses frequency-dimension convolution and bidirectional long short-term memory to abstract speech features, uses time-dimension bidirectional long short-term memory and attention module to summarize time context information within a window, and uses deformation gradients to represent facial motion. As shown in FIG. 1, the method mainly includes six steps: extracting speech features, collecting frequency information, summarizing time information, decoding action features, driving a facial model, and finally repeating the previous five steps by sliding a signal window over a speech sequence to obtain a complete animation sequence.

1. Extract speech features: extract Mel spectrogram features from speech within one window; the features being a three-dimensional tensor composed of a feature map dimension, a frequency dimension, and a time dimension.

1.1 Perform short-term Fourier transform on a speech signal with an input audio window length $L_{audio}$ (a frame length is $L_{fft}$, and a frame interval is $L_{hop}$); and convert, by using $F_{mel}$ Mel filters, Fourier transform results to a Mel frequency to obtain Mel spectrogram with a frame length $L_{frame}$.

1.2 Take first and second derivatives of the Mel spectrogram with respect to time as auxiliary features, and stack the auxiliary features with original features to form a tensor in the shape of $3 \times F_{mel} \times L_{frame}$, wherein 3 in the first dimension denotes the number of feature maps, $F_{mel}$ in the second dimension denotes the length of the frequency dimension, and $L_{frame}$ in the third dimension denotes the length of the time dimension.

2. Collect frequency information: for the Mel spectrogram obtained in step (1), abstract and collect, by using a neural network, all frequency information along a direction of the frequency dimension, to obtain frequency abstract information.

2.1 For the Mel spectrogram obtained in step (1), extract a local frequency feature of the Mel spectrogram by using a two-dimensional convolutional network; the two-dimensional convolutional network sequentially includes: a first two-dimensional convolutional layer, a first two-dimensional maximum pooling layer, a second two-dimensional convolutional layer, and a second two-dimensional maximum pooling layer; the two two-dimensional convolutional layers perform convolution calculation on inputs respectively through $C_{freq\_conv0}$ and $C_{freq\_conv1}$ convolution kernels (whose sizes are both $K_{freq} \times 1$, wherein $K_{freq}$ denotes the magnitude of the direction of the frequency dimension, and 1 denotes the magnitude of the direction of the time dimension) along the direction of the frequency dimension to acquire a number of local feature maps (the number is equal to the number of the convolution kernels), and the two two-dimensional convolutional layers use a Leaky ReLU with a negative tilt rate of 0.2 as an activation function; the two two-dimensional maximum pooling layers select local feature maximum values in a region (of the size $S_{freq} \times 1$) along the direction of the frequency dimension, to complete a down-sampling pooling operation; and the local frequency feature obtained is a tensor in the shape of $$C_{freq\_conv1} \times \frac{F_{mel}}{S_{freq2}} \times L_{frame},$$

wherein $C_{freq\_conv1}$ in the first dimension denotes the number of feature maps, $$\frac{F_{mel}}{S_{freq2}}$$

in the second dimension denotes the length of the frequency dimension, and $L_{frame}$ in the third dimension denotes the length of the time dimension.

2.2 For the local frequency feature obtained in step (2.1), project the local frequency feature by using $C_{freq\_conv2}$ convolution kernels whose size are 1×1 (both the magnitude of the direction of the frequency dimension and the magnitude of the direction of the time dimension are 1); take the Leaky ReLU with a negative tilt rate of 0.2 as the activation function; and output a tensor in the shape of $$C_{freq\_conv2} \times \frac{F_{mel}}{S_{freq2}} \times L_{frame},$$

wherein $C_{freq\_conv2}$ in the first dimension denotes the number of feature maps, $$\frac{F_{mel}}{S_{freq2}}$$

in the second dimension denotes the length of the frequency dimension, and $L_{frame}$ in the third dimension denotes the length of the time dimension.

Figure 2:
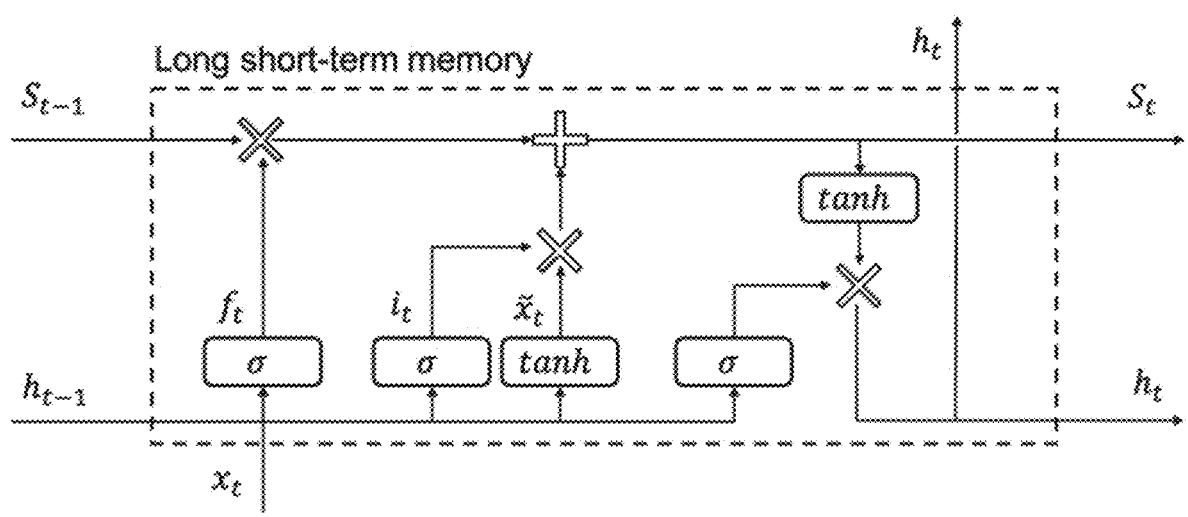
FIG. 2 is a schematic workflow of a long short-term memory in sub-step (2.3) of step (2) in the method according to the present disclosure.

2.3 For the local frequency feature after projection which is obtained in step (2.2), along positive and negative directions of the frequency dimension, recurrently process each feature of the frequency dimension with a long short-term memory on the frequency dimension. As shown in FIG. 2, the long short-term memory has a state machine (used to store historical information of the memory) and three gates. An input gate $i_t$ acts on each frequency feature $x_t$ (x denotes an input, the subscript t denotes the $t^{th}$ input moment) and an output $h_{t-1}$ in a previous step (h denotes an output, and the subscript t–1 denotes the $(t–1)^{th}$ input moment, that is, the previous step) of the memory, and indicates whether to allow addition of new frequency information to the state machine of the memory, and the value ranges from 0 to 1 (including two ends). If the value of the input gate is 1 (that is, open the gate), new information is added. If the value is 0 (that is, close the gate), a zero vector is added. If the value is a value between 0 and 1, the new information multiplied by the gate value is added. A forget gate $f_t$ acts on the state machine of the memory, and indicates whether to retain historical frequency information $S_{t-1}$ stored in the state machine in the previous step (S denotes a state of the state machine, and the subscript t–1 denotes the $(t–1)^{th}$ input moment, that is, the previous step), and the value ranges from 0 to 1 (including two ends). If the value of the forget gate is 1 (that is, open the gate), stored information is retained. If the value is 0 (that is, close the gate), the stored information is reset to a zero vector. If the value is a value between 0 and 1, the stored information multiplied by the gate value is retained. An output gate $o_t$ acts on the state machine of the memory, and indicates whether to take a current state $S_t$ (S denotes a state of the state machine, and the subscript t denotes the $t^{th}$ input moment) of the memory as an output, and the value ranges from 0 to 1 (including two ends). If the value is 1 (that is, open the gate), the current state of the memory is taken as an output. If the value is 0 (that is, close the gate), a zero vector is taken as an output. If the value is a value between 0 and 1, the current state of the memory multiplied by the gate value is taken as an output. Specific values of the three gates are obtained by connecting and projecting the current input $x_t$ and the output $h_{t-1}$ in the previous step of the memory, of which the specific formula is as follows:

$$i_t = \sigma(W_i[x_t, h_{t-1}] + b_i)$$

$$f_t = \sigma(W_f[x_t, h_{t-1}] + b_f)$$

$$o_t = \sigma(W_o[x_t, h_{t-1}] + b_o)$$

$$\tilde{x}_t = \tan h(W_x[x_t, h_{t-1}] + b_x)$$

$$S_t = f_t * S_{t-1} + i_t * \tilde{x}_t$$

$$h_t = o_t * \tan h(S_t) \quad (1)$$

where $x_t$ is the current input, and $h_{t-1}$ is the output in the previous step of the memory; $i_t$ is the value of the input gate, and $W_i$ and $b_i$ are a weight and a bias parameter of the input gate respectively; $f_t$ is the value of the forget gate, and $W_f$ and $b_f$ are a weight and a bias parameter of the forget gate respectively; $o_t$ is the value of the output gate, and $W_o$ and $b_o$ are a weight and a bias parameter of the output gate respectively; it is a projection for the current input and the output in the previous step, and $W_f$ and $b_f$ are a weight and a bias parameter of the projection respectively; $S_{t-1}$ and $S_t$ are a state in the previous step and a current state of the state machine of the memory respectively; and $h_t$ is a current output of the memory.

The number of feature maps of the long short-term memory in each direction is $$\frac{C_{freq\_LSTM}}{2},$$

the sum of the numbers of feature maps in two directions is $C_{freq\_LSTM}$, and thus an output of the bidirectional long short-term memory in this step is a tensor in the shape of $$C_{freq\_LSTM} \times \frac{F_{mel}}{S_{freq2}} \times L_{frame},$$

wherein $C_{freq\_LSTM}$ in the first dimension denotes the number of feature maps, $$\frac{F_{mel}}{S_{freq2}}$$

in the second dimension denotes the length of the frequency dimension, and $L_{frame}$ in the third dimension denotes the length of the time dimension.

The state machine of the long short-term memory and three gates operating around the state machine make it possible to fully consider features of other frequencies when analyzing features of a frequency, and conform to the natural phenomenon that formants occur in human articulation.

2.4 Concatenate all outputs of the long short-term memory along the positive and negative directions of the frequency dimension in step (2.3) to form a vector to obtain a tensor in the shape of $$\frac{C_{freq\_LSTM} \times F_{mel}}{S_{freq2}} \times L_{frame},$$

wherein $$\frac{C_{freq\_LSTM} \times F_{mel}}{S_{freq}^2}$$

in the first dimension denotes the number of feature maps, and $L_{frame}$ in the second dimension denotes the length of the time dimension; and use a fully connected layer with the number of feature maps of $C_{freq}$ for projection, and collect information of all frequencies, to obtain that the frequency abstract information $z_{freq}$ being a tensor in the shape of $C_{freq} \times L_{frame}$, wherein $C_{freq}$ in the first dimension denotes the number of feature maps, and $L_{frame}$ in the second dimension denotes the length of the time dimension. So far, the frequency dimension has been fully collected and abstracted into the feature map dimension.

Figure 3:
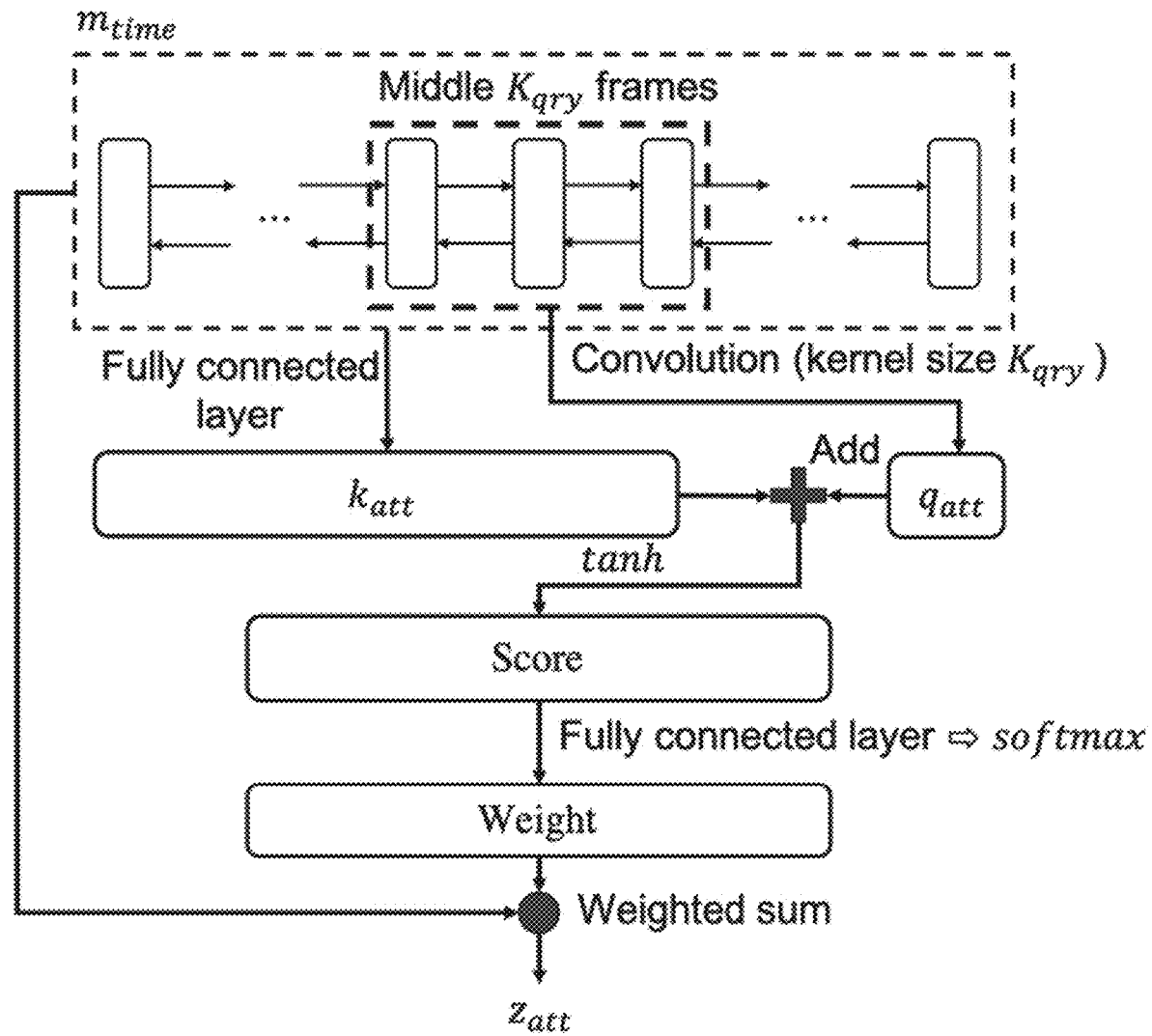
FIG. 3 is a schematic flowchart of step (3) in the method according to the present disclosure.

3. Summarize time information: for the frequency abstract information obtained in step (2), determine, by using the neural network, a degree of importance of each frame of information in a time context along a direction of the time dimension, and perform summarization according to the degrees of importance, to obtain time summary information. The specific process is shown in FIG. 3.

3.1 For the frequency abstract information obtained in step (2), use two hidden layers to transmit time dimension information to obtain time context information; in each of the hidden layers, along positive and negative directions of the time dimension, recurrently process each frame in the time dimension by using a long short-term memory to transmit time information. The long short-term memory has the same structural principle as the long short-term memory described in step (2.3), but acts on the direction of the time dimension, and has a state machine (used to store historical information of the memory) and three gates. An input gate acts on each frame of time feature and an output in a previous step of the memory, and indicates whether to allow addition of new time frame information to the state machine of the memory, and the value ranges from 0 to 1 (including two ends). If the value of the input gate is 1 (that is, open the gate), new information is added. If the value is 0 (that is, close the gate), a zero vector is added. If the value is a value between 0 and 1, the new information multiplied by the gate value is added. A forget gate acts on the state machine of the memory, and indicates whether to retain historical time information stored in the state machine in the previous step, and the value ranges from 0 to 1 (including two ends). If the value of the forget gate is 1 (that is, open the gate), stored information is retained. If the value is 0 (that is, close the gate), the stored information is reset to a zero vector. If the value is a value between 0 and 1, the stored information multiplied by the gate value is retained. An output gate acts on the state machine of the memory, and indicates whether to take a current state of the memory as an output, and the value ranges from 0 to 1 (including two ends). If the value is 1 (that is, open the gate), the current state of the memory is taken as an output. If the value is 0 (that is, close the gate), a zero vector is taken as an output. If the value is a value between 0 and 1, the current state of the memory multiplied by the gate value is taken as an output. Specific values of the three gates are obtained by connecting and projecting the current input time frame (or a previous output of the hidden layer) and the output in the previous step of the memory.

The number of feature maps of the long short-term memory in each direction is $$\frac{C_{time}}{2},$$

the sum of the numbers of feature maps in two directions is $C_{time}$, and thus time context information $m_{freq}$ obtained in this step is a tensor in the shape of $C_{time} \times L_{frame}$, wherein $C_{time}$ in the first dimension denotes the number of feature maps, and $L_{frame}$ in the second dimension denotes the length of the time dimension.

3.2 For the time context information obtained in step (3.1), use a hidden layer to determine a weight of importance of each frame of information in a context and to perform weighting and summarization; in the hidden layer, select $K_{qry}$ frames in the middle of the time context information $m_{freq}$ to be projected by $C_{att}$ one-dimension convolution kernels (also of the size of $K_{qry}$) as a query item $q_{att}$ (the shape is $C_{att} \times 1$, wherein $C_{att}$ is the number of feature maps which is the same as the number of the convolution kernels, and 1 is the length of the time dimension), linearly project the entire time context information $m_{freq}$ as a key-value item $k_{att}$ (the shape is $C_{att} \times L_{frame}$, wherein $C_{att}$ is the number of feature maps, and $L_{frame}$ is the length of the time dimension), normalize the sum of the query item $q_{att}$ and the key-value item $k_{att}$ with a tan h activation function, linear projection and softmax (the number of feature maps is projected from $C_{att}$ into 1), to obtain a weight of each frame (the shape is $1 \times L_{frame}$), and use the weight to weight and summarize the time context information $m_{freq}$, to obtain time summary information $z_{att}$ (the shape is $C_{time}$, wherein $C_{time}$ is the number of feature maps). The hidden layer imitates the pattern of human natural pronunciation through the weight of time dimension. For example, pronunciation of a vowel has a long time span, and pronunciation of a consonant is manifested as transient pronunciation and is related to transition vowels before and after the consonant.

4. Decode action features: connect the time summary information obtained in step (3) to a one-hot vector of a control style inputted by a user; output scaling/shearing coefficients and rotation coefficients respectively through two branches of the neural network, and combine the coefficients outputted by the two branches to obtain deformation gradients representing facial actions.

The present disclosure uses deformation gradients to represent facial actions in speech-driven speech animation for the first time, and can describe local changes of facial motion more accurately than the previous technologies.

4.1 Deformation Gradient

The present disclosure uses a method described in "(Robert W Sumner and Jovan Popovic. Deformation transfer for triangle meshes. ACM Transactions on graphics (TOG), 23(3):399-405, 2004.)" to calculate deformation gradients of a facial model. The facial model is composed of three triangular face segments. $v_i^{(k)}, \tilde{v}_i^{(k)}, k \in \{1,2,3\}$ are used to represent three vertices of the $i^{th}$ triangle in the facial model and the deformed facial model respectively. In order to deal with the deformation perpendicular to the direction of the triangle, the fourth vertex of the triangle is calculated according to the following formula:

$$n_i = (v_i^{(2)} - v_i^{(1)}) \times (v_i^{(3)} - v_i^{(1)}) \tag{2}$$

-continued $$v_i^{(4)} = v_i^{(i)} + \frac{n_i}{\sqrt{|n_i|}}$$

The deformation gradient of the $i^{th}$ triangle is a transformation matrix $T_i$ satisfying the following formula:

$$T_i V_i = \tilde{V}_i \quad (3)$$

where $V_i$ and $\tilde{V}_i$ are formed by stacking three vectors of reference and deformed triangles respectively:

$$V_i = [v_i^{(2)} - v_i^{(1)} v_i^{(3)} - v_i^{(1)} v_i^{(4)} - v_i^{(1)}]$$

$$\tilde{V}_i = [\tilde{v}_i^{(2)} - \tilde{v}_i^{(1)} \tilde{v}_i^{(3)} - \tilde{v}_i^{(1)} \tilde{v}_i^{(4)} - \tilde{v}_i^{(1)}] \quad (4)$$

Therefore, $T_i = \tilde{V}_i V_i^{-1}$.

The present disclosure further uses a method described in "(Qianyi Wu, Juyong Zhang, Yu-Kun Lai, Jianmin Zheng, and Jianfei Cai. Alive caricature from 2d to 3d. In Proceedings of the IEEE Conference on Computer Vision and Pattern Recognition, pages 7336-7345, 2018)" to perform polar decomposition on the transformation matrix, $T_i = R_i S_i$. Here, $S_i$ denotes scaling|shearing transformation, and is a symmetric matrix, which may be represented with 6 parameters; $R_i$ denotes rotation transformation, and may be represented with 3 parameters by using Rodrigues' formula. Therefore, a deformation gradient of each triangle is represented with 9 parameters.

The deformation gradient in the present disclosure is defined on one template facial model. The template facial model is expressionless and mouth-closed and is composed of N triangles. Therefore, the corresponding deformation gradient includes 9N=6N+3N parameters.

4.2 Decode Actions $C_{speaker}$-dimension one-hot vector for controlling a speaker style is concatenated to the time summary information $z_{att}$ obtained in step (3). $z_{dec}$ (in the shape of $C_{dec0}$) is obtained through a fully connected layer with the number of feature maps of $C_{dec0}$ and a Leaky ReLU (LReLU) activation function with a negative tilt rate of 0.2. Then, $z_{dec}$ goes through two neural network branches that are similar in structure and parallel to decode scaling/shearing and rotation parameters.

In each branch, $z_{dec}$ is connected to a $C_{speaker}$-dimension one-hot control vector again and projected by three fully connected layers. The number of feature maps of the first fully connected layer is $C_{dec1}$, and the activation function is LReLU with a negative tilt rate of 0.2. The number of feature maps of the second fully connected layer is $C_{dec2}$, and the activation function is tan h. The third fully connected layer has no activation function (in scaling/shearing and rotation branches, the numbers of feature maps are $C_{pca\_s}$ and $C_{pca\_r}$ respectively). At the end of the branch is a fixed linear fully connected layer (in scaling/shearing, and rotation branches, the numbers of feature maps are 6N and 3N respectively), and parameters thereof are initiated by a principal component analysis base and a mean of training data corresponding to the branch. 97% of the energy is retained during principal component analysis, and the numbers of bases retained in the scaling/shearing and rotation branches are $C_{pca\_s}$ and $C_{pca\_r}$ respectively (which are the same as the numbers of feature maps in the third fully connected layer of the branch). The two branches are decoded respectively to obtain a parameter s (the size of which is 6N) representing scaling/shearing and a parameter r (the size of which is 3N) representing rotation.

5. Drive a facial model: for any given facial model (expressionless and mouth-closed), drive the facial model by using the deformation gradients obtained in step (4), to perform a corresponding facial action.

5.1 Obtain a triangle correspondence between a given facial model (composed of M triangles) and a template facial model (composed of N triangles) (each given model only needs to perform this sub-step once).

If the topologies of the given facial model and the template facial model are different from each other, the deformation gradient obtained in step (4) cannot be used directly. A triangular correspondence between the two models needs to be obtained first. if the topologies are the same, the deformation gradient can be used directly.

The present disclosure uses a method described in "(Robert W Sumner and Jovan Popovic. Deformation transfer for triangle meshes. ACM Transactions on graphics (TOG), 23(3):399-405, 2004.)" to automatically solve a triangular correspondence between two facial models with different topologies under the condition that the user is given correspondences of a number of vertices.

The automatic solving method first needs to find a series of transformation matrices (including scaling/shearing and rotation transformation, but not including translation transformation) $O_i$, $i \in \{1, \ldots, M\}$ to deform the given facial model to a state closest to the template facial model. The sum E of the following three energy equations $E_S$, $E_I$, $E_C$ and an energy equation under limited conditions is defined, and E is minimized to deform the given facial model to a target state:

$$E_S = \sum_{i=1}^{M} \sum_{j \in adj(i)} \|O_i - O_j\|^2 \quad (3)$$

$$E_I = \sum_{i=1}^{M} \|O_i - I\|^2$$

$$E_C = \sum_{i=1}^{n} \|\hat{v}_i - c_i\|^2$$

$$\min_{\hat{v}_1 \ldots \hat{v}_n} E = w_S E_S + w_I E_I + w_C E_C, \text{ subject to } \hat{v}_{s_k} = m_k, k \in \{1 \ldots m\}$$

where $E_S$ denotes the energy that constrains smoothness of the deformation, M is the number of triangles in the given facial model, and adj(i) denotes a set of neighboring triangles around the $i^{th}$ triangle; $E_I$ denotes the energy that constrains the degree of the deformation, and I denotes a unit matrix; $E_C$ denotes the energy of a distance between vertices of the two models after deformation, n is the number of vertices in the given facial model, $\hat{v}_i$ is the position of the vertex of the given facial model after deformation, and $c_i$ is the position of the vertex, closest to v'_i, in the template facial model; E is the sum of the first three energy items, $\hat{v}_1 \ldots \hat{v}_n$ denotes the positions of n vertices in the given facial model after deformation, $w_S$, $w_I$, and $w_C$ are weights corresponding to $E_S$, $E_I$, and $E_C$ respectively, the energy equation is subject to m vertex correspondences given by the user, $\hat{v}_{s_k}$ is the position of the vertex of the given facial model after deformation in the $k^{th}$ vertex correspondence, and $m_k$ is the target position of the vertex in the $k^{th}$ vertex correspondence.

In the process of minimizing the above energy equation E, $\{\hat{v}_i, c_i\}$ (i.e. the nearest vertex in the template facial model for each vertex of the given facial model after deformation) needs to be found. During optimization, the vertex position changes, and the relationship of the nearest vertex also changes. Therefore, it is necessary to iterate several steps in the process of finding the nearest vertex and minimizing the above energy equation E.

After the given facial model is deformed to the state closest to the template facial model, the centroid of all the triangles in the template facial model and the given facial model after deformation is calculated. For each triangle in the given facial model after deformation, to find a reasonable corresponding triangle in the template facial model, a centroid distance needs to be less than a particular threshold (manually adjusted) and an angle between two normal vectors needs to be less than 90°. Similarly, for each triangle in the template facial model, a reasonable corresponding triangle is found in the given facial model after deformation. All reasonable correspondences constitute a triangle correspondence between the two models.

5.2 Migrate deformation gradients corresponding to the template facial model to the given facial model:

The scaling/shearing parameter s and the rotation parameter r obtained in step (4) are restored to a transformation matrix set $\{T_i\}_{i=1}^{N}$ of all triangles of the template facial model (wherein N is the number of transformation matrices of the template facial model, which is equal to the number of the triangles). A transformation matrix set $\{T_i\}_{i=1}^{M'}$ of the given facial model is constructed according to the triangle correspondence obtained in step (5.1) (wherein M' is the number of transformation matrices of the given facial model; if a triangle k in the given facial model does not have a corresponding triangle in the template facial model, a unit matrix is taken as a transformation matrix of k; if it has a corresponding triangle, a transformation matrix of the corresponding triangle is taken as a transformation matrix of k; if it has multiple corresponding triangles, a number of copies are made for k, and each copy corresponds to one of them; since there is a case of having multiple corresponding triangles, the number of transformation matrices finally obtained is M'≥M).

5.3 Solve positions of vertices of the given facial model according to the migrated deformation gradients:

By minimizing the following energy equation, the positions of vertices $\tilde{x}$ of the given facial model is calculated under the deformation gradient corresponding to the migration:

$$E(c)=\|c-A\tilde{x}\|^2 \tag{6}$$

where c is formed by stacking of $\{T_i\}_{i=1}^{M'}$, and A is a large sparse matrix that associates c with $\tilde{x}$. By setting the gradient of the energy equation to 0, $\tilde{x}$ can be solved by the following formula:

$$A^T A\tilde{x}=A^T c \tag{7}$$

Since A is only related to the given facial model, A and $A^T A$ can be pre-calculated, and each model requires only one precalculation.

6. Slide a signal window: repeating step (1) to step (5), and process all speech signal windows, to generate complete facial animation.

On the whole input speech signal, a series of audio windows are acquired at an interval of $$\frac{1}{fps}$$

seconds. Steps (1) to (5) are repeated for each window to generate complete animation at a frame rate of fps frames per second. The generation speed may reach real-time and the delay is $$\frac{L_{audio}}{2}$$

(wherein $L_{audio}$ is the input audio window length described in step (1)).

Implementation Example

Loss function: the inventor trains neural network parameters involved in steps (2) to (4) by using a supervised learning method. Speech and animation data are organized into a number of data pairs $(x_t, y_t)$, wherein $x_t$ represents a speech signal window corresponding to data in the $i^{th}$ frame, and $y_t$ represents a corresponding deformation gradient parameter. According to the description in step (4), $y_t$ can be further divided into a scaling/shearing part $s_t \in \mathbb{R}^{6N}$ and a rotation part $r_t \in \mathbb{R}^{3N}$. In the training process, the outputs in step (4) are marked as $\tilde{s}_t$ and $\tilde{r}_t$. For the two parts of the parameters, the present disclosure uses similar energy items for constraints. Taking the scaling/shearing part as an example, the energy items include $L_d^s$ considering an absolute value and $L_v^s$ considering a numerical time derivative:

$$L_d^s=\|s_t-\tilde{s}_t\|^2$$

$$L_v^s=\|(s_t-s_{t-1})-(\tilde{s}_t-\tilde{s}_{t-1})\|^2 \tag{8}$$

For the rotation part, the manner of defining $L_d^r$ and $L_v^r$ is similar to that of the above formula. The final loss function is the weighted sum of four energy terms, and weights are automatically dynamically balanced using the technologies proposed by Karras et al. (Tero Karras, Timo Aila, Samuli Laine, Antti Herva, and Jaakko Lehtinen. Audio-driven facial animation by joint end-to-end learning of pose and emotion. ACM Transactions on Graphics (TOG), 36(4):94, 2017.).

Training example: the inventor implements the example of the present disclosure on a computer equipped with an Intel Core i7-8700K central processing unit (3.70 GHz) and a NVIDIA GTX1080Ti graphics processor (11 GB). A database VOCASET (Daniel Cudeiro, Timo Bolkart, Cassidy Laidlaw, Anurag Ranjan, and Michael Black. Capture, learning, and synthesis of 3D speaking styles. Computer Vision and Pattern Recognition (CVPR), pages 10101-10111, 2019.) is used to train the model during the implementation.

Model parameters: when the inventor implements the example of the present disclosure, the parameters involved in steps (1) to (6) are as follows:

(1) Extract speech features: an audio window length $L_{audio}$=0.568 seconds; a short-term Fourier transform frame length $L_{fft}$=0.064 seconds, and a frame interval $L_{hop}$=0.008 seconds; the number of Mel filters $F_{mel}$=128; and the number of Mel spectrogram frames obtained $L_{frame}$=64.

(2) Collect frequency information: the numbers of convolution kernels (also the number of feature maps after convolution) are $C_{freq\_conv0}$=32, $C_{freq\_conv1}$=64, and $C_{freq\_conv2}$=64 respectively; the size of the convolution kernels of the first two layers is $K_{freq}$=3, and the size of a pooling region is $S_{freq}$=2; the sum of the numbers of feature maps of the bidirectional long short-term memory of the frequency dimension is $C_{freq\_LSTM}$=64 (i.e. the number of feature maps in a single direction is 32); and the number of feature maps for fully connected projection is $C_{freq}=256$.

(3) Summarize time information: the sum of the numbers of feature maps of the bidirectional long short-term memory of the time dimension is $C_{time}=512$ (i.e. the number of feature maps in a single direction is 256); and in the attention module, $K_{qry}=3$ and $C_{att}=128$.

(4) Decode action features: the number of triangles of the template facial model is N=9976; a speaker style control vector dimension is $C_{speaker}=8$; the number of feature maps of the first fully connected layer is $C_{dec0}=512$; the numbers of feature maps of the first two fully connected layers in each branch are $C_{dec1}=512$, $C_{dec2}=256$; the number of principal component analysis bases retained by the scaling/shearing parameter s (also the number of feature maps of the third fully connected layer in the scaling/shearing branch) is $C_{pca\_s}=85$, and the number of principal component analysis bases retained by the rotation parameter r (also the number of feature maps of the third fully connected layer in the rotation branch) is $C_{pca\_r}=180$.

(5) Drive a facial model: M is determined specifically by given model parameters; in the process of iterating and optimizing the formula (5) in step (5.1), the first step is $w_S=1.0$, $w_I=0.001$, and $w_C=0$, then the fourth step is iterated, and $W_C$ changes from 1 to 5000.

(6) Slide a signal window: steps (1) to (5) are repeated: an animation frame rate is fps=60.

Example time consumption: VOCASET's facial model is taken as a template facial model (composed of 9976 triangles), and the model is trained on VOCASET's data for 50 iterations, which takes about 5 hours. For the input speech signal, each window generates one frame of animation (from step (1) to (5), the template facial model is directly driven in step (5)), which takes about 10 milliseconds to achieve a real-time rate. For other given facial models whose topology is different from that of the template facial model, correspondences of model triangles should be set in advance according to step (5.1). It takes about 15 to 40 minutes according to the complexity of the model and the proficiency of the implementer. This work only needs to be done once for any model.

Figure 4:
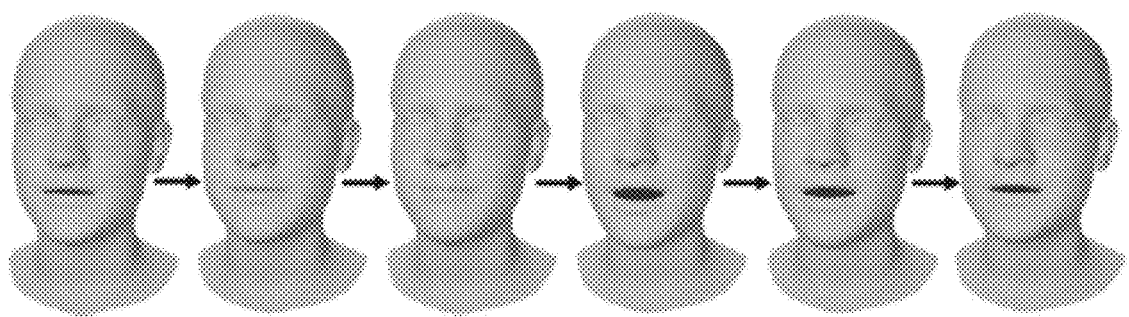
FIG. 4 is an implementation example of driving facial model animation by speech signals according to the present disclosure, which is a sequence excerpt of an animation frame for driving a human face model to say an English word "smash"
Figure 5:
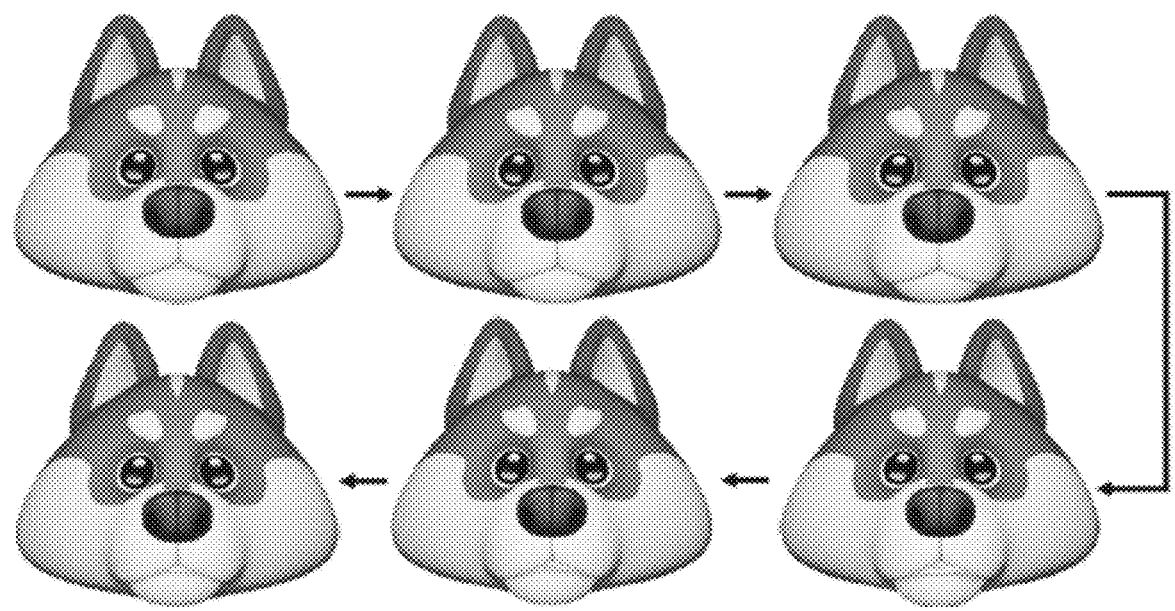
FIG. 5 is an implementation example of driving facial model animation by speech signals according to the present disclosure, which is a sequence excerpt of an animation frame for driving a cartoon animal face model to say an English word "smash".

Animation excerpt: the inventor implements the example of the present disclosure by using speech signals to drive facial animation. When VOCASET's facial model is used to generate speech animation, sequence excerpt frames thereof are as shown in FIG. 4 (in which a person is saying an English word "smash"). When a cartoon animal facial model whose topology is different from that of the template facial model is used to speech animation, sequence excerpt frames thereof are as shown in FIG. 5 (in which a cartoon animal is saying an English word "smash").

What is claimed is:

1. A speech-driven facial animation generation method, comprising steps of:
   (1) extracting speech features: extracting Mel spectrogram features from speech in a window; the features being a three-dimensional tensor composed of a feature map dimension, a frequency dimension, and a time dimension;
   (2) collecting frequency information: for the Mel spectrogram obtained in step (1), abstracting and collecting, by using a neural network, all frequency information along a direction of the frequency dimension, to obtain frequency abstract information;
   (3) summarizing time information: for the frequency abstract information obtained in step (2), determining, by using the neural network, a degree of importance of each frame of information in a time context along a direction of the time dimension, and performing summarization according to the degree of importance, to obtain time summary information;
   (4) decoding action features: connecting the time summary information obtained in step (3) to a one-hot vector of a control style inputted by a user; outputting scaling/shearing coefficients and rotation coefficients respectively through two branches of the neural network, and combining the coefficients outputted by the two branches to obtain deformation gradients representing facial actions;
   (5) driving a facial model: for any given expressionless and mouth-closed facial model, driving the facial model by using the deformation gradients obtained in step (4), to perform a corresponding facial action; and
   (6) sliding a signal window: repeating step (1) to step (5), and processing all speech signal windows, to generate complete facial animation.

2. The speech-driven facial animation generation method according to claim 1, wherein step (1) comprises steps of:
   (1.1) performing short-term Fourier transform on a speech signal with an input audio window length $L_{audio}$, a frame length being $L_{fft}$, and a frame interval being $L_{hop}$; and converting, by using $F_{mel}$ Mel filters, Fourier transform results to a Mel frequency to obtain Mel spectrogram with a frame length $L_{frame}$; and
   (1.2) taking first and second derivatives of the Mel spectrogram with respect to time as auxiliary features, and stacking the auxiliary features with original features to form a tensor in a shape of $3 \times F_{mel} \times L_{frame}$, wherein 3 in a first dimension denotes the number of feature maps, $F_{mel}$ in a second dimension denotes a length of the frequency dimension, and $L_{frame}$ in a third dimension denotes a length of the time dimension.

3. The speech-driven facial animation generation method according to claim 1, wherein step (2) comprises steps of:
   (2.1) for the Mel spectrogram obtained in step (1), extracting a local frequency feature of the Mel spectrogram by using a two-dimensional convolutional network; the two-dimensional convolutional network sequentially comprising: a first two-dimensional convolutional layer, a first two-dimensional maximum pooling layer, a second two-dimensional convolutional layer, and a second two-dimensional maximum pooling layer; the two two-dimensional convolutional layers obtaining a number of local feature maps by performing convolution calculation on inputs through $C_{freq\_conv0}$ and $C_{freq\_conv1}$ convolution kernels whose sizes are both $K_{freq} \times 1$ along the direction of the frequency dimension respectively, wherein the number of the local feature maps is equal to the number of the convolution kernels, $K_{freq}$ denotes a magnitude of the direction of the frequency dimension, and 1 denotes a magnitude of the direction of the time dimension; the two two-dimensional convolutional layers use a leaky rectified linear unit with a negative tilt rate of 0.2 as an activation function; the two two-dimensional maximum pooling layers select local feature maximum values in a region of the size $S_{freq} \times 1$ along the direction of the frequency dimension, to complete a down-sampling pooling operation; and the local frequency feature obtained is a tensor in a shape of $$C_{freq\_conv1} \times \frac{F_{mel}}{S_{freq}^2} \times L_{frame},$$

wherein $C_{freq\_conv1}$ in a first dimension denotes the number of feature maps, $$\frac{F_{mel}}{S_{freq}^2}$$

in a second dimension denotes a length of the frequency dimension, and $L_{frame}$ in a third dimension denotes a length of the time dimension;

(2.2) for the local frequency feature obtained in step (2.1), projecting the local frequency feature by using $C_{freq\_conv2}$ convolution kernels whose size are 1×1; taking the leaky rectified linear unit with a negative tilt rate of 0.2 as the activation function; and outputting a tensor in a shape of $$C_{freq\_conv\,2} \frac{F_{mel}}{S_{freq}^2} \times L_{frame},$$

wherein $C_{freq\_conv2}$ in the first dimension denotes the number of feature maps, $$\frac{F_{mel}}{S_{freq}^2}$$

in the second dimension denotes the length of the frequency dimension, $L_{frame}$ in the third dimension denotes the length of the time dimension, and the size being 1×1 indicates that both the magnitude of the direction of the frequency dimension and the magnitude of the direction of the time dimension are equal to 1;

(2.3) for the local frequency feature after projection obtained in step (2.2), along positive and negative directions of the frequency dimension, recurrently processing each feature of the frequency dimension with a long short-term memory on the frequency dimension; and (2.4) concatenating all outputs of the long short-term memory along the positive and negative directions of the frequency dimension in step (2.3) to form a vector to obtain a tensor in a shape of $$\frac{C_{freq\_LSTM} \times F_{mel}}{S_{freq2}} \times L_{frame},$$

wherein $$\frac{C_{freq\_LSTM} \times F_{mel}}{S_{freq2}}$$

in the first dimension denotes the number of feature maps, and $L_{frame}$ in the second dimension denotes the length of the time dimension; and using a fully connected layer with the number of feature maps of $C_{freq}$ for projection, and collecting information of all frequencies, to obtain that the frequency abstract information $z_{freq}$ is a tensor in a shape of $C_{freq} \times L_{frame}$, wherein $C_{freq}$ in the first dimension denotes the number of feature maps, and $L_{frame}$ in the second dimension denotes the length of the time dimension; such that the frequency dimension has been fully collected and abstracted into the feature map dimension.

4. The speech-driven facial animation generation method according to claim 1, wherein step (3) comprises steps of:

(3.1) for the frequency abstract information obtained in step (2), using two hidden layers to transmit time dimension information to obtain time context information $m_{freq}$; in each of the hidden layers, along positive and negative directions of the time dimension, recurrently processing each frame on the time dimension by using a long short-term memory to transmit time information; the number of feature maps of the long short-term memory in each direction being $$\frac{C_{time}}{2},$$

a sum of the numbers of the feature maps in the two directions being $C_{time}$, and the time context information $m_{freq}$ being a tensor in a shape of $C_{time} \times L_{frame}$, wherein $C_{time}$ in a first dimension denotes the number of feature maps, and $L_{frame}$ in a second dimension denotes the length of the time dimension; and (3.2) for the time context information obtained in step (3.1), using a hidden layer to determine a weight of importance of each frame of information in a context and to perform weighting and summarization; in the hidden layer, selecting $K_{qry}$ frames in a middle of the time context information $m_{freq}$ to be projected by Catt one-dimension convolution kernels of the size of $K_{qry}$ as a query item $q_{att}$; linearly projecting the entire time context information $m_{freq}$ as a key-value item $k_{att}$; normalizing a sum of the query item $q_{att}$ and the key-value item $k_{att}$ with a tan h activation function, linear projection and softmax, to obtain a weight of each frame; and using the weight to perform weighting and summarization on the time context information $m_{freq}$, to obtain time summary information $z_{att}$; a shape of the query item $q_{att}$ being $C_{att} \times 1$, wherein $C_{att}$ is the number of feature maps, which is the same as the number of the convolution kernels; and 1 is the length of the time dimension; a shape of the key-value item $k_{att}$ being $C_{att} \times L_{frame}$, wherein $C_{att}$ is the number of feature maps, and $L_{frame}$, is the length of the time dimension; the number of feature maps for the linear projection being projected from $C_{att}$ into 1; a shape of the weight being $1 \times L_{frame}$; and a shape of the time summary information $z_{att}$ being $C_{time}$, wherein $C_{time}$ is the number of feature maps.

5. The speech-driven facial animation generation method according to claim 1, wherein in step (4), the facial action is represented with the deformation gradients, the deformation gradients are defined on a template facial model, and the template facial model is expressionless and mouth-closed and is composed of N triangles.

6. The speech-driven facial animation generation method according to claim 1, wherein step (5) comprises the steps of:

(5.1) obtaining a triangle correspondence between a given facial model and a template facial model, the facial model being composed of M triangles, and the template facial model being composed of N triangles;

(5.2) migrating deformation gradients corresponding to the template facial model to the given facial model; and (5.3) solving positions of vertices of the given facial model according to the migrated deformation gradients.

\* \* \* \* \*